United States Patent

Antalek

[15] 3,671,624
[45] June 20, 1972

[54] METHOD OF USING A PORTABLE COOLING PLATEN

[72] Inventor: Michael P. Antalek, c/o Texaco Inc., P.O. Box 509, Beacon, N.Y. 12508

[22] Filed: April 30, 1970

[21] Appl. No.: 43,622

Related U.S. Application Data

[62] Division of Ser. No. 739,801, June 25, 1968, abandoned.

[52] U.S. Cl. .............................. 264/294, 264/320, 264/327
[51] Int. Cl. .......................................................... B29c 3/00
[58] Field of Search ...................... 264/327, 294, 1, 320, 322, 264/92; 165/1; 100/38, 93

[56] References Cited

UNITED STATES PATENTS

| | | | |
|---|---|---|---|
| 2,532,501 | 12/1950 | Johnson | 264/322 X |
| 2,812,549 | 11/1957 | Wall | 264/294 X |
| 3,060,516 | 10/1962 | Van Houten | 264/327 X |
| 3,317,644 | 5/1967 | Takai | 264/320 X |

*Primary Examiner*—Robert F. White
*Assistant Examiner*—Richard R. Kucia
*Attorney*—K. E. Kavanagh and Thomas H. Whaley

[57] ABSTRACT

A method of cooling a molded plastic article in a press without cooling the heated press platens. It employs portable cooling platens and involves opening the press, inserting the cooling platens and reapplying pressure while cooling the plastic article until it is frozen.

5 Claims, 4 Drawing Figures

PATENTED JUN 20 1972 3,671,624

METHOD OF USING A PORTABLE COOLING PLATEN

CROSS-REFERENCE TO RELATED APPLICATION

This is a division of application Ser. No. 739,801, filed June 25, 1968 now abandoned.

BACKGROUND OF THE INVENTION

1. Field of the Invention

This invention pertains to the field of plastic molding in general, and particularly to the molding of thin plastic articles, especially sheets, for use in testing of different plastic materials. It concerns a method of using portable cooling platens, the structure of which is included as one aspect of the invention.

2. Description of the Prior Art

Heretofore in the process of molding thin plastic sheets (particularly for use in testing of different plastic materials) there has been a lengthy delay period required in the process. This has been because of the fact that the press that was employed in molding such plastic sheets, has heating elements in its platens in order to provide the necessary temperature at the same time as the required pressure. Such heating elements in the platens of the press, of necessity, have a large total heat absorbtive mass (or thermal capacity) inherent in the structure thereof. For this reason, the process of molding desired articles, did entail a considerable time period following the heating and pressure application in the mold during formation of the plastic article. Such time was required in order to cool down the mold sufficiently to freeze the plastic article while it was still under required pressure. By making use of apparatus and a method in accordance with this invention, the delay period for such cooling step may be substantially eliminated and, consequently, the quantity production of plastic articles may be greatly increased.

SUMMARY

The invention may be briefly described as a method for molding plastic material samples which comprises the steps of, placing a quantity of plastic material ingredients in a portable mold, and heating a pair of press platens to a predetermined temperature. The method also comprises placing said portable mold between said heated press platens, and applying heat and pressure to said press platens until said ingredients have been melted and subjected to a desired pressure. In addition, the method comprises opening said press platens, and inserting a pair of cooling platens with said portable mold therebetween. The method additionally comprises reapplying pressure to said press platens while cooling said mold, until said melted ingredients have solidified, then again opening said press platens and removing said mold for further handling of said sample.

DESCRIPTION OF THE PREFERRED EMBODIMENTS

Figure 1:
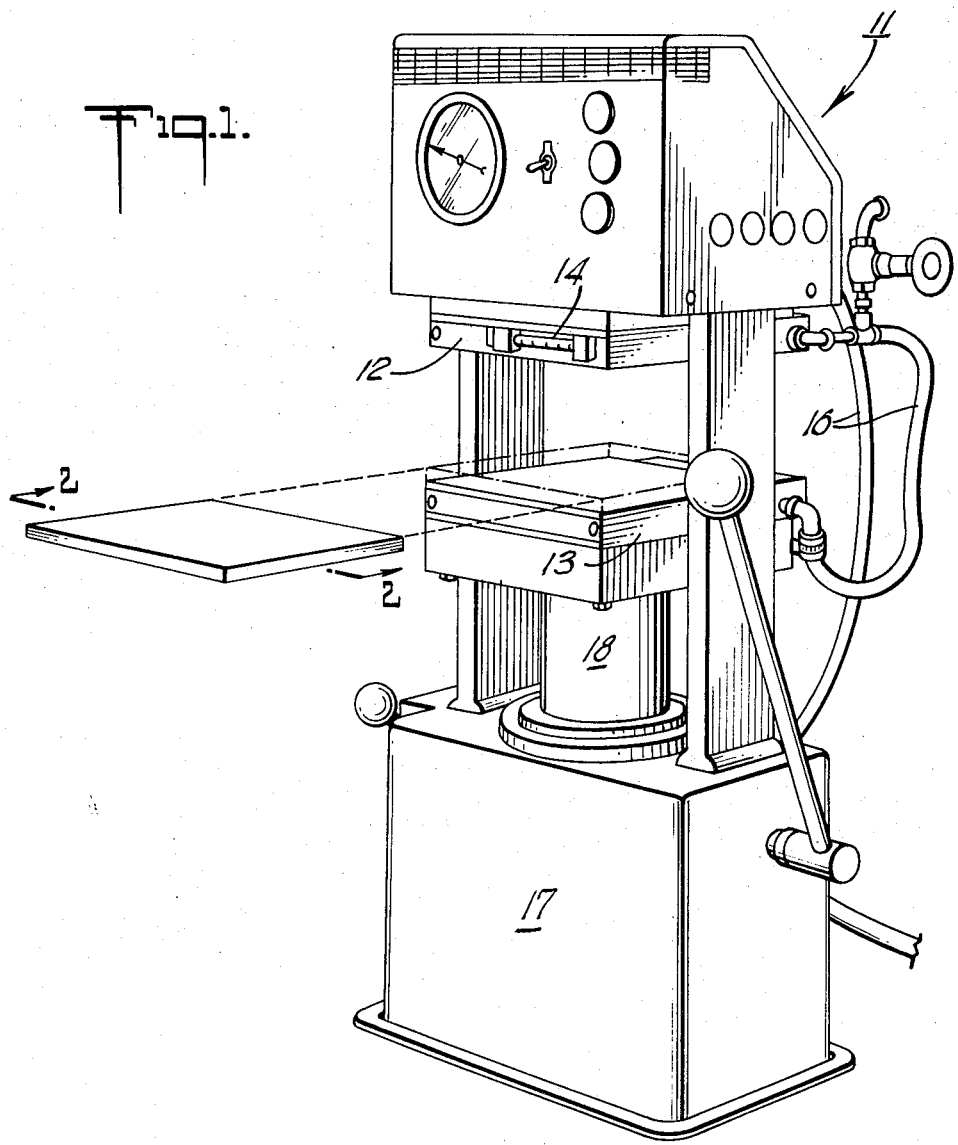
FIG. 1 is a schematic perspective, showing a press of the type with which this invention may be employed and indicating schematically a mold plus cooling platens, ready for insertion in the press.

Referring to FIG. 1 of the drawings, there is illustrated a conventional hydraulic press 11 which has heated platens 12 and 13 between which the work to be pressed will be placed. These platens 12 and 13 are equipped with internal electrical heaters (not shown) for obtaining desired high temperatures. The temperature obtained may be indicated by separate thermometers, on for each platen, e.g., a thermometer 14 indicated on the front edge of platen 12. In this way temperature may be observed while being regulated as desired, in order to heat anything that is being pressed.

The platens 12 and 13 of the foregoing press 11, are also equipped with internal cooling coils (not shown), that have hoses 16 coupled thereto in order to introduce a cooling fluid, such as water, which will initially turn to steam under the high temperatures employed in molding plastic articles. However, it will be discovered from the following description of this invention that the cooling equipment need not be employed during a process according to this invention, and consequently the time required for carrying out such cooling of these platens is eliminated.

It will be clear from the illustration of FIG. 1 that the press 11 operates to cause the lower platen 12 to be moved upward so as to bring both platens 12 and 13 together. This is accomplished by moving the lower platen 13 which is connected to a piston or ram (not shown) which moves within a cylinder (not shown), both of which are located inside a base portion 17 of the press 11. The connection from the ram to the platen 13 may include an interchangeable ram adapter 18 that is attached to and supports the platen 13 for moving same upward to apply pressure between platen 12 and 13, as desired.

By way of background for this invention, it may be explained that heretofore the process of molding sheets or discs of plastic material, involved the placement of raw or semi-prepared materials within a mold followed by heating and pressing of the mold to cause desired shaping and curing of the molded article. In the case of thin sheets, the mold merely comprised a steel frame having desired thickness in order to gauge the finished molded plastic sample, plus a pair of backing plates, one for each side of such frame. For example, see FIG. 3. These elements when placed together would go to make up a mold that was placed between the heated platens 12 and 13. Then the desired pressure and temperature was applied as necessary. Thereafter the desired pressure and temperature would be maintained for a sufficient period to cause melting of the plastic article (i.e., a sample sheet being formed) and then the cooling in order to solidify the plastic sample sheet was accomplished. The cooling would be done while maintaining pressure on the mold, by introducing cooling fluid into the platens 12 and 13 (with the electric heaters turned off, of course). However, since the temperature involved is high and the amount of thermal capacity of the platens is very substantial, the time required for cooling to cause freezing of the plastic sample was quite extensive and during all of this time the press was unavailable for any other use.

By employing apparatus and a method according to this invention, the time required for cooling (as indicated above) may be substantially reduced so that the time required for molding additional articles in a given hydraulic press, may be reduced by between one-half and three-fifths of the time previously required. This time saving may be accomplished with the use of cooling platens in accordance with the invention.

Figure 4:
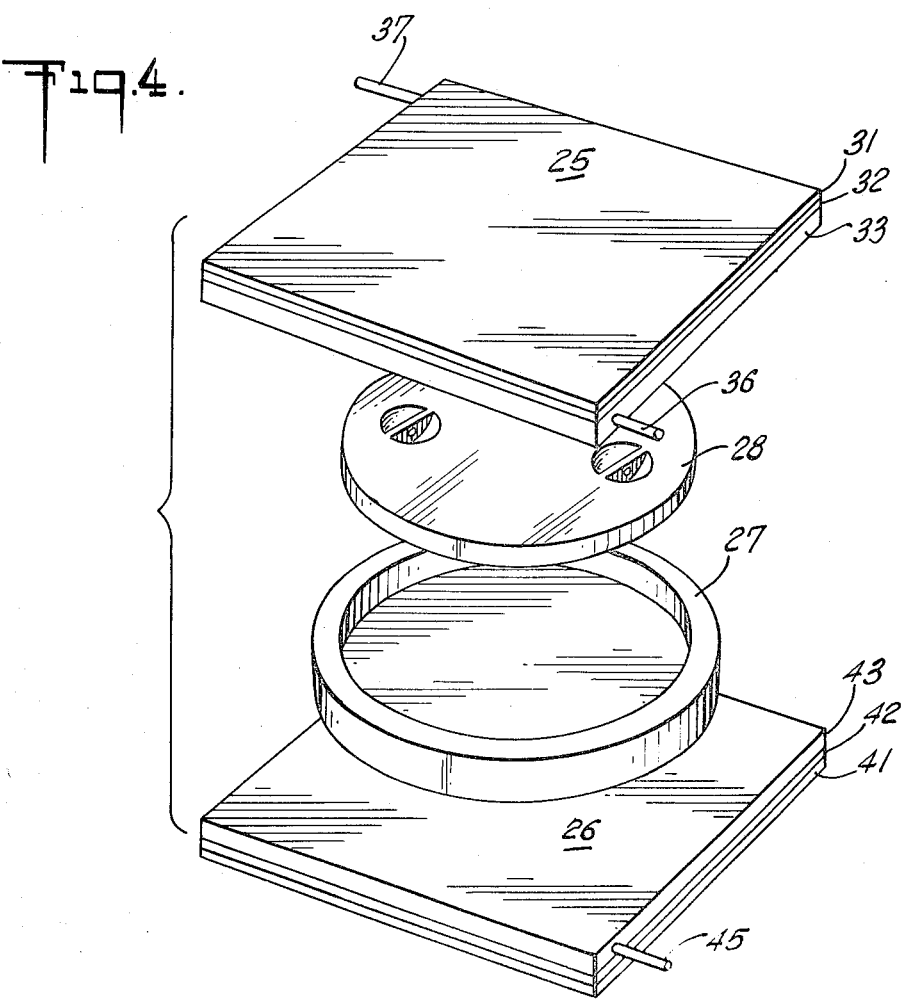

The cooling platens may take various forms and are specifically illustrated in two different forms, one for the thin-sheet molds (see FIG. 2) and one for thicker plastic articles, such as sample discs that will be formed in a mold like that illustrated in FIG. 4. Here the portable platens for cooling are of a type including internal cooling passages. These platens also are illustrated in FIG. 4.

Thus, with reference to FIG. 4, it will be observed that there are illustrated two substantially identical cooling platens 25 and 26 that will be placed when in use, one on either side of a plastic-article mold 27. Mold 27 has a removable disc 28 which has a given thickness designed for leaving a desired space thereunder, above the bottom of the mold 27 when the disc 28 is flush with the top of the mold. In that space, the plastic sample will be formed when a molding step is completed.

Since both of the portable cooling platens 25 and 26 are substantially the same in construction, reference need be had to only one of them for describing the details thereof. Thus, it will be observed that cooling platen 25 is made up of an outer layer 31 constructed of a high heat resistant material such as one including asbestos therein and having adequate strength for withstanding the pressures involved, as well as having the ability to withstand the high temperatures without burning. Next, there is an inner layer 32 that is constructed of a hard board material which again has sufficient strength for withstanding the pressures involved, but which in this case is constructed of material having maximum heat insulating qualities. Finally, there is another outer layer 33 to which the other two layers 31 and 32 are firmly attached in any feasible manner (not shown). This layer 33 is made of steel and has internal passages (not shown) for circulating a cooling fluid therein. The cooling will be accomplished by circulating a cooling fluid, e.g., water in through one of a pair of pipe connectors 36 and out through the other connector 37. It will be appreciated that under the conditions of molding plastic samples with which this invention is concerned, the introduction of water into the cooling passages may at first form steam because of the high temperature involved.

Figure 2:
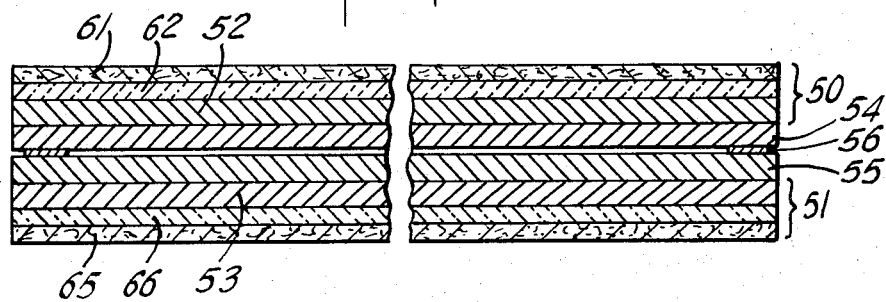
FIG. 2 is an enlarged, schematic, broken elevation view partly in cross-section taken along the lines 2—2 of FIG. 1 and showing the elements going to make up a thin-sheet plastic mold, plus two cooling platens one on either side thereof, all being ready for insertion into the press.

As indicated above, the other cooling platen 26 is substantially the same as the platen 25. However, it is illustrated the other side up. It has an outer layer 41 made of high temperature resistant material such as one including asbestos therein that will not burn upon contact with one of the hot press platens 12 or 13 (FIG. 1). Next, there is an intermediate layer 42 that is constructed of material having high heat insulating qualities. Finally, there is another outer layer 43 that is constructed of a strong, heat-conductive material such as steel. The latter also has internal cooling passages (not shown). These passages are connected to inlet and outlet pipes for connecting a source of circulating cooling fluid to the passages. For example, there is a pipe 45 and another similar pipe (not shown) at the back corner of the platen 26.

Where the plastic samples being molded are substantially thinner than the samples formed with a mold such as that illustrated in FIG. 4, the portable cooling platens according to the invention are generally of a similar construction but do not employ any internally cooled members. This is because the heat dissipation requirements are considerably reduced. Thus, this modification of a cooling platen is rectangular in shape and has dimensions to suit the press that will be employed with the platens. The layers used in this modification are illustrated in FIG. 2.

As noted above, FIG. 2 shows, partly in cross sections, a composite group or sandwich of two portable cooling platens with a thin-sheet mold in between. The first three layers starting at the top (as viewed in FIG. 2) are all together a portable cooling platen 50. The bottom three layers go to make up another substantially similar cooling platen 51 that is placed beneath the plastic sample mold group, but turned over. It will be understood that inside layers 52 and 53 are made of a good heat conductive metal, preferably brass.

Figure 3:
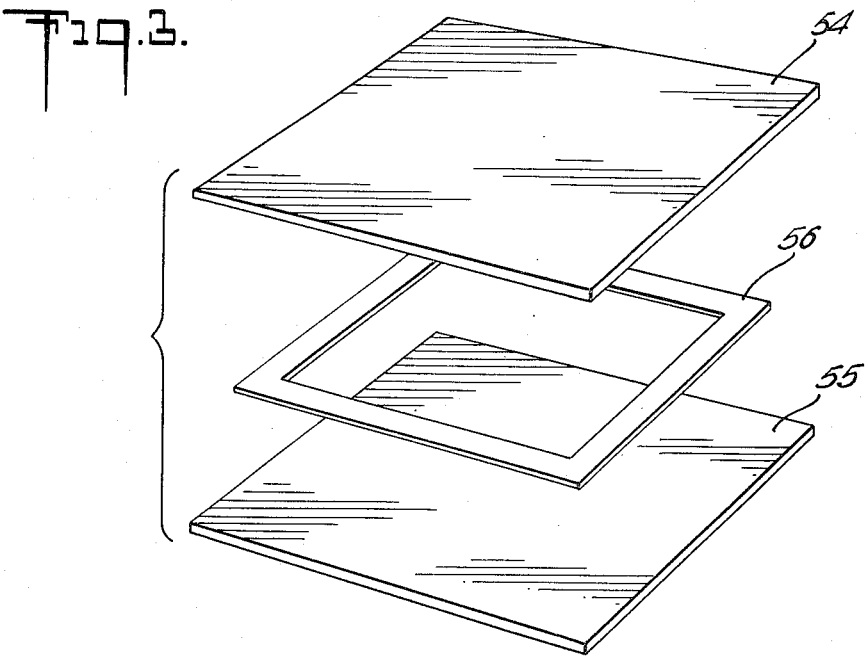
FIG. 3 is a schematic perspective illustrating the elements of a mold for making thin plastic articles in sheet form, especially for use as samples in testing different ingredients for plastic articles; and FIG. is a schematic perspective illustrating a mold for a thicker sample of plastic material, shown with its parts in coaxial but separated positions and located between a pair of cooling platens having a modified structure to include internal cooling passages for circulating a cooling fluid therein.

As already indicated, the thin-sheet plastic mold is illustrated in FIG. 3. It is made up of a backing sheet or plate 54 and another plate or backing sheet 55 both made of a sufficiently strong metal to withstand the molding pressures. Between these mold plates is located a frame 56 that is preferably made of steel. It has a predetermined thickness for determining the thickness of the plastic sample that will be molded. This thin-sheet mold forms no part, per se, of the invention; but it is the structure that has been employed heretofore in molding sheets of a predetermined thickness of plastic material, to be used for testing such plastic in order to determine its characteristics.

METHOD OF MOLDING PLASTIC SAMPLE

The method according to this invention is particularly applicable to molding of plastic material samples which are made in thin sheets, or thicker disc shaped articles. However, it will be appreciated that the method need not be limited to such plastic articles since it will have general application to many different shapes and kinds of plastic molded articles, where the molding process employed is applicable. The steps of the method are described in chronological order, although this is not necessarily the order in which such steps must be carried out. Thus, the method includes the steps of:

1. A quantity of plastic material ingredients are placed in a portable mold. This, as previously indicated, will involve the placement of unprepared or partially prepared ingredients for the plastic sample into the mold. The mold may, of course, be either the thin or the thicker mold structure as described above. Or, it may take other forms for producing different shaped articles as desired.

2. The press platens will be heated to a desired temperature, at which the mold is to be maintained in order to process the plastic sample during its formation. It will be understood that the press platens will have heat supplied, as required, after the mold is in the press in order to raise the temperature in the mold (and the plastic material therein) to he desired temperature and then retain same for the desired period of time.

3. The mold with its plastic material ingredients therein is placed between the heated press platens, and the press is closed with the mold therein.

4. heat is then applied to the press platens as already indicated above. This will bring the mold up to temperature while pressure also is provided by forcing the lower platen up against the mold which then contacts the upper platen and is squeezed between them. The pressure and temperature as applied by the press will each be maintained at a predetermined amplitude for sufficient time to cause melting, forming and curing of the plastic sample as desired.

5. The press platens will be opened in order to allow removal of the mold with the melted sample therein.

6. A pair of colling platens will be inserted one above and one beneath the mold, with the cooling platens having their heat resistant external layers outwardly faced from the mold for contacting the hot platens of the press. This step may be accomplished by sliding the mold out from between the press platens after they have been separated by lowering the bottom one.

To assist in the foregoing, one of the cooling platens may be supported in front of the press with its metallic outer layer facing up so that the hot mold may slide from the press platen onto the cooling layer of the cooling platen. Then the other cooling platen will be placed on top, facing the other way up so that its heat-conductive-material layer will also be contacting the mold. Finally, the group of cooling platens with mold therebetween will be slid back onto the press between the hot press platens.

7. Next, pressure will be reapplied by the press so that it will hold the plastic sample under predetermined pressure. This is for cooling and will be carried out for a sufficient time to permit the sample to solidify or freeze. After that it may be again removed from the press.

8. The press platens will once more be opened for permitting removal of the mold and cooling platens while the press platens will have been retained at high temperature throughout.

9. Finally, the mold will be removed from the press and its further handling may involve placing it to one side in order to permit the cooling to continue until it reaches unprotected handling temperature.

It may be noted that the first few steps of the above defined method are not different from the prior known method of molding plastic articles, but they are a necessary part of a complete and unitary process as defined in this application.

In Step (7) above the cooling step is merely a matter of time, in the instance when the thin-sheet mold (FIG. 3) is employed. The heat is dissipated by conduction through the metallic layers of the mold and of the cooling platens 50 and 51 which are all insulated from the hot press platens 12 and 13 by layers 61 and 62 (see FIG. 2) of platen 50 and layers 65 and 66 of platen 51. It will be appreciated that these insulating layers are like the corresponding layers 31, 32 and 41, 42 of the cooling platens illustrated in FIG. 4. Consequently, no further description is needed.

It will be clear that an additional aspect of the invention is the ability to repeat the process with another mold, without delay. This means that whereas prior to this invention, a molded article had to be cooled by cooling the press platens before removal of the mold. By using the method of this invention, the press platens may remain hot. Therefore, not only does the cooling of the mold take less time, since the portable cooling platens are cold when inserted, but the reheating of the press platens prior to the next molding process, is avoided.

It will be appreciated that another specific manner of carrying out the cooling Step (7) above relates to the process when thicker plastic samples are being molded, e.g., those using a mold like the one illustrated in FIG. 4. Here the portable cooling platens will be like those illustrated in FIG. 4 also, and the cooling will include introduction of a cooling fluid for circulation through both platens 25 and 26. This will cool these platens and the mold 27 therebetween but without cooling the hot press platens 12 and 13 because of the insulating layers on the cooling platens 25 and 26.

While the invention has been described herein in accordance with the applicable statutes, with relation to specific embodiments thereof, this is not to be taken in any way as limiting the invention but merely as being descriptive thereof.

I claim:

1. A method for molding plastic material samples, comprising the steps of
   placing a quantity of plastic material ingredients in a portable mold,
   heating a pair of press platens to a predetermined temperature,
   placing said portable mold between said heated press platens,
   applying heat and pressure to said press platens until said ingredients have been melted and subjected to a desired pressure,
   opening said press platens,
   inserting a pair of cooling platens with said portable mold therebetween,
   reapplying pressure to said press platens while cooling said mold until said melted ingredients have solidified,
   again opening said press platens, and
   removing said mold for further handling of said sample.

2. A method according to claim 1, wherein said cooling comprises waiting for a period of time sufficient to dissipate heat in said mold without cooling said press platens.

3. A method according to claim 2 further including repeating the process to mold another sample without delay.

4. A method according to claim 3 wherein said cooling comprises applying a cooling fluid to the cooling platens for a period of time sufficient ti dissipate heat in said mold without cooling said press platens.

5. A method according to claim 4 further including repeating the process to mold another sample without delay.

* * * * *